Patented Oct. 7, 1941

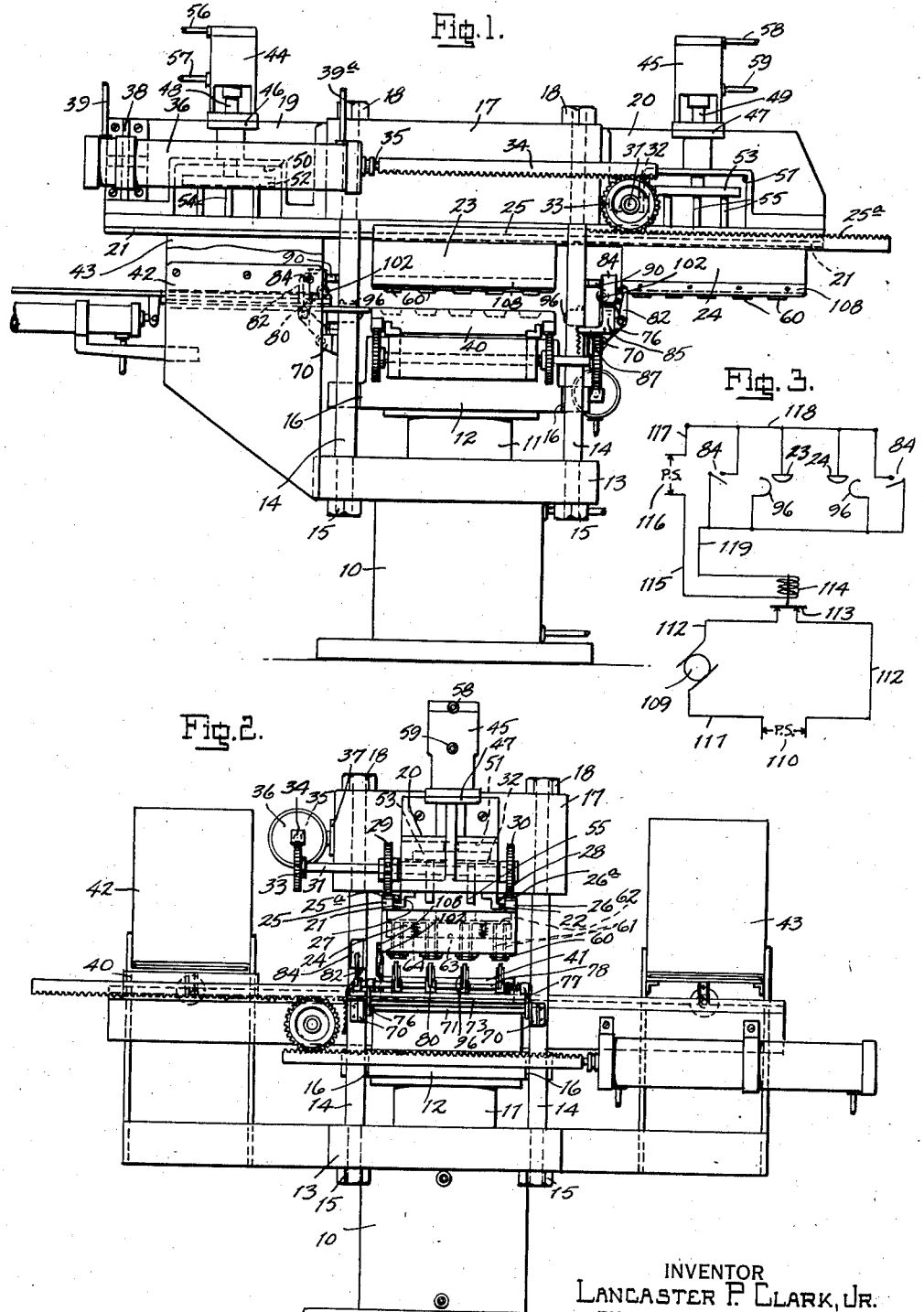

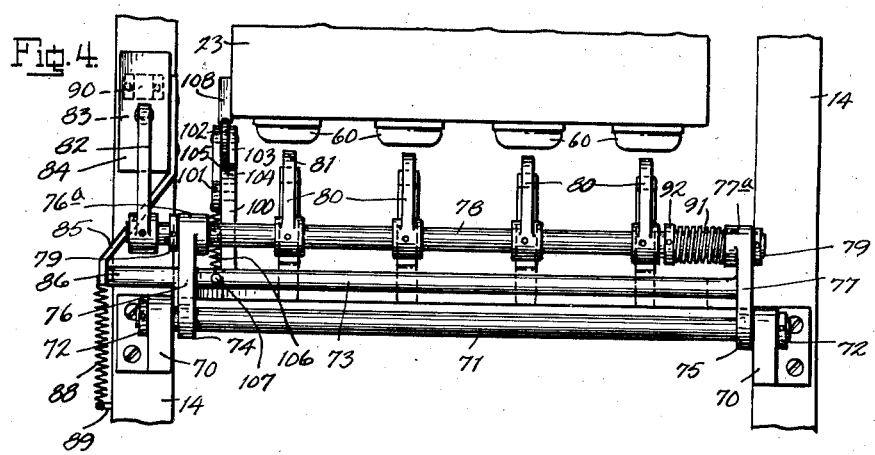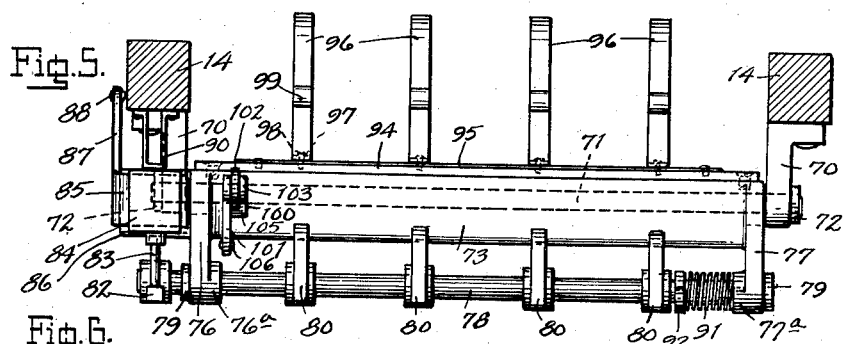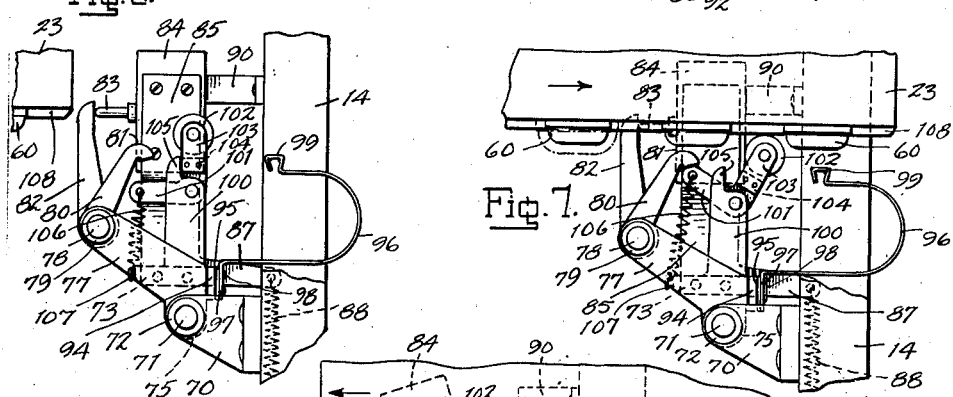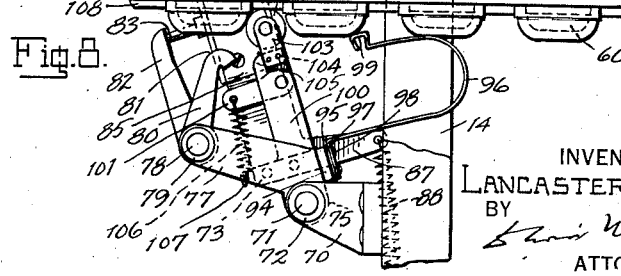

2,257,732

UNITED STATES PATENT OFFICE 2,257,732

SAFETY STOP MECHANISM FOR AUTOMATIC MOLDING MACHINES

Lancaster P. Clark, Jr., Fairfield, Conn.

Application June 24, 1939, Serial No. 281,005

7 Claims. (Cl. 18—16)

The present invention relates to a safety stop mechanism for automatic molding machine, particularly for molding plastic material, and wherein the molded pieces are adapted to remain upon one of the die parts as the molding operation is completed and the press is opened to separate the die parts, the die part supporting the molded pieces adapted to be moved out of the press for the purpose of having the molded pieces removed or ejected therefrom. A machine of this type is disclosed in my co-pending application for Automatic molding machine, Ser. No. 211,478, filed June 3, 1938, and the present invention is illustrated by way of example in relation to a machine of the type disclosed in one of the embodiments of the invention covered therein. In this embodiment there are provided duplex sets of molding dies, one set of which is adapted to be subjected to the operations such as ejecting and reloading which occur outside of the press, while the other set is in the press undergoing the operations such as heating, compressing, gassing and curing which take place in the press. The upper die parts of the two sets of molding dies are connected in tandem and are adapted to be automatically moved into and out of the press to have the molded pieces ejected therefrom, and the lower die parts are also connected in tandem, and are adapted to be moved into and out of the press to have the mold cavities therein loaded with the powder, pellets or other material to be molded.

The various operations are synchronized by suitable controlling means and the machine is adapted to be operated continuously and automatically without the necessity for any manual operations.

It is an object of the present invention to provide a safety stop mechanism for the purpose of automatically stopping the machine in the event, (1) that after the molding operation and opening of the press one or more of the molded pieces remain in the lower cavity part of the mold, and (2) that after the ejection operation outside of the press one or more of the molded pieces remain upon the upper force die part of the mold. Upon automatic stoppage of the machine for either of these causes the attendant may remove the molded piece from the cavity part of the mold in the one case, or from the force part of the mold in the other, and then re-start the machine so that its automatic operation can continue. It will thus be seen that the machine will always be entirely clear during its automatic operation, so that there will be no chance of damage to the machine or spoilage of the product through a molded piece accidentally remaining in the mold parts.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a front elevation of an automatic molding machine, provided with safety stop means according to the invention, a portion of the loading hopper at one side being broken away for the sake of clearance.

Fig. 2 is a side elevation of the right hand side of the machine as seen in Fig. 1.

Fig. 3 is a diagrammatic plan of the electrical connections employed.

Fig. 4 is a side elevation, on an enlarged scale, of the safety stop mechanism at one side of the machine, the same being shown in its neutral position, that is, with one of the upper mold parts in its normal position within the press, while the other mold part is in its normal position outside of the press.

Fig. 5 is a plan view thereof.

Fig. 6 is an end elevation.

Fig. 7 is an end elevation showing the position of the stop mechanism during movement of the upper mold part from its ejecting position outside of the press to the molding position within the press, the dot-and-dash lines indicating one of the molded pieces remaining upon the die.

Fig. 8 is a side elevation showing the position of the stop mechanism during movement of the upper mold part from its position within the press to its ejecting position outside of the press, the molded pieces being shown in place upon the force dies.

Similar reference characters indicate corresponding parts throughout the several figures of the drawings.

Referring to the drawings and more particularly to Figs. 1 and 2 thereof, the press illustrated is of the type in which the lower platen is movable, and consists of a base 10, containing a hydraulic ram 11 carrying the lower platen 12, the base being provided at its upper end with a projecting flange 13 in which the lower ends of the four corner posts 14 are secured by nuts 15, the platen 12 being cut out at its corners, as at 16, to have sliding engagement with the posts. Upon the upper ends of the post there is mounted an upper fixed platen or head 17 secured by nuts 18.

In the automatic machine illustrated a pair of upper force die mold parts are provided which are adapted to be automatically moved from side to side and into and out of the press, one mold part being in the press while the other mold part is moved to the right, and this latter mold part being in the press while the first mold part is moved to the left, the molded articles being ejected from the mold part which is out of the press, while the other mold part is in the press. Upon the lower platen there are provided two lower cavity mold parts adapted to be moved into and out of the press from front to back, one cavity mold part being in the press while the other is out of the press where it is loaded with the material to be molded. If desired the upper mold parts may be arranged to move from front to back and the lower mold parts from side to side.

Upon the respective sides of the head 17 there are secured ejector brackets 19 and 20, the lower surfaces of these brackets constituting continuations of the lower surface of the head 17, and upon which continuous lower surfaces there are secured guide rails 21 and 22. The upper force die mold parts 23 and 24 are rigidly secured together in spaced tandem relation by means of rack bars 25 and 26 at each side, these rack bars being provided along a portion of their upper surfaces with rack teeth 25ᵃ and 26ᵃ respectively, and being provided at their inner surfaces with inwardly extending flanges 27 and 28 respectively, which engage the rails 21 and 22 to thus slidably support the two mold parts so that they may be moved into and out of the press and into and out of relation with the respective ejector brackets 19 and 20.

This movement is imparted to the dies by means of gears 29 and 30, mounted upon a shaft 31 journaled in a bearing portion 32 provided in the ejector bracket 20, this shaft being provided at its outer end with a gear 33 which meshes with a rack 34 secured to the end of the piston rod 35 of a hydraulic cylinder 36, which is supported at one end by means of a bracket 37, secured to the forward side of the head 17, and at its other end by means of a bracket 38, secured to the ejector bracket 19. This cylinder 36 has connected to it hydraulic tubes 39 and 39ᵃ which supply fluid pressure to operate the rod in opposite directions, and which extend to a suitable automatic control device designed to synchronize the action of the cylinder with the other hydraulic cylinder actuated parts of the machine, it being understood that the other hydraulic cylinders, as well as the hydraulic ram 11, are similarly connected to such automatic control device. Such control device usually consists of an electric motor operated shaft upon which there are provided a series of cams, each cam being designed for the particular hydraulic cylinder and being adjustable to accurately control the operation of such cylinder, these cams controlling the valving of the respective cylinders. Such devices are the well known Bristol and Summit time cycle and control system. While hydraulic cylinders are illustrated it will be understood that pneumatic or any other suitable type of power means may be employed.

The starting and stopping of the machine being controlled by the starting and stopping of an electric motor, it is thought that it will be sufficient to the complete understanding of the invention to illustrate this motor diagrammatically in relation to the electric connections for automatically stopping it.

Inasmuch as the illustrated embodiment of the invention is concerned with the movement of the upper mold parts into and out of the press for the purpose of ejecting the molded pieces, it is thought that a detailed description of this part of the machine will suffice to an understanding of the invention. As to the lower die mold parts it is thought that a complete detail description is unnecessary. These lower mold parts 40 and 41 are in the form of cavity molds, are connected together in spaced tandem relation, and are adapted to be automatically moved into and out of the press from front to rear in substantially the same manner as the upper mold parts. In their respective positions out of the press they are disposed in relation to the loading mechanisms 42 and 43, which are adapted to move into relation therewith to automatically load the cavities with material to be molded, the loaded mold part being moved into the press as the other mold part is moved out.

Upon the respective ejector brackets 19 and 20 there are provided vertically disposed hydraulic cylinders 44 and 45 mounted upon bearing portions 46 and 47 formed upon the brackets, and in which operate vertically movable piston rods 48 and 49, the lower ends of these rods being disposed respectively in upwardly recessed pocket portions 50 and 51 of the brackets, and having secured thereon within these pocket portions ejector plates 52 and 53 carrying ejector pins 54 and 55 respectively. The cylinder 44 is provided with hydraulic tubes 56 and 57 and the cylinder 45 is provided with hydraulic tubes 58 and 59, these being connected to the synchronizing control mechanism above referred to.

Each of the mold parts 23 and 24 is provided with the plurality of force dies 60 of the mold, and in relation to each of these there are provided ejector pins 61, the lower ends of which are flush with the surfaces of the force dies 60 and the upper ends of which are connected to a plate 62 disposed within a suitable recess 63 in the mold part, this plate being normally pressed upwardly by springs 64. The ejecting operation consists in depressing the ejector plate for the respective mold, so that the ejector pins thereof contact the plate 62 thereby forcing the ejector pins 61 downwardly to cause the molded pieces to be forced from the dies 60, the same dropping into a suitable receptacle.

At each side of the press there is mounted upon the corner posts 14 the safety stop mechanism according to the invention, one of these mechanisms being in position to be operated by the left hand mold part 23 as it moves into and out of the press, while the other is in position to be operated by the right hand mold part 24, as it moves into and out of the press. Inasmuch as both of these mechanisms are of identical structure and operation, only one will be described in detail.

A pair of angular bearing brackets 70—70 are secured respectively to the forward and rearward corner posts 14 at one side and support a transverse shaft 71, retained at each end by means of pinned collars 72. Upon this shaft there is rotatably mounted a swinging cradle member 73 provided at its respective ends with downwardly projecting bearing ears or lugs 74 and 75, engaged by the shaft, and with outwardly projecting upwardly inclined arms 76 and 77, provided with apertured bearing end portions 76ª and 77ª respectively, in which there is journaled a shaft 78 secured against longitudinal movement by means of pinned collars 79.

In spaced relation along the shaft 78 there are secured lever arms 80 arranged in longitudinal line with the rows of force dies 60, these lever arms being normally disposed in upwardly projecting inwardly inclined position, and having their upper end portions rounded, as at 81, for engagement by any of the molded articles which remain upon the die after the ejecting operation and as the upper mold part starts to move into the press, as will hereinafter more fully appear.

One end of the shaft 78 projects and has secured thereon a switch operating lever arm 82, which engages the switch actuating spring pressed plunger 83 of a switch unit 84, which is supported upon the cradle by means of a bracket member 85 secured at its lower end to a projecting flange 86 of the cradle and secured at its upper end to the switch unit. The bracket member 85 is provided at its lower end with a rearwardly extending arm 87, a spring 88 being connected between the end of this arm and a pin 89 secured to the post 14, and normally tending to rotate the cradle member and the parts carried thereby in clockwise direction, as seen in Fig. 6, and to yieldably retain it in its normal position against a stop member 90 secured to the post 14 and engaged by the rearward wall of the switch unit 84. A spring 91 is coiled about one end of the shaft 78, and has one end secured to the bearing portion 77ª of the arm 77 and its other end secured to a pinned collar 92 upon the shaft, this spring normally rotating the shaft in clockwise direction, as seen in Fig. 6, to maintain the lever arm 82 in engagement with the actuating plunger 83 of the switch. This spring 91 is weaker than the spring of the switch which projects the plunger 83, so that it is necessary in order to actuate the switch to impart rotation of the shaft 78 by a force directly applied in clockwise direction against the lever arms 80.

Upon the inner end of the cradle member there is secured a strip of electric insulating material 94, to which there is secured a conductor strip 95 and upon this contductor strip there is mounted a series of spring contact arms 96, these contact arms having their attaching base portions 97 secured to the conductor strip 95 by screws 98 and extending from these base portions inwardly and being curved upwardly and outwardly and each provided at its ends with an inverted U-shaped contact portion 99. These contact members are also disposed in longitudinal line with the rows of force dies 60, and are adapted as the dies supporting the molded articles move out of the press into ejecting position to wipingly engage the molded articles, which act as insulators to prevent the establishment of an electrical connection, as wlil hereinafter more fully appear, but which, in the event of one of the molded articles remaining in the cavity mold so that the force die 60 is exposed, contacts this exposed die and establishes an electrical connection to stop the machine.

An upwardly projecting standard 100 is formed upon the upper side of the cradle near one end, and has pivoted thereon a bell crank member 101, disposed at one side of the standard and supporting at its upper end a roller 102 retained in place by an angular bracket member 103, this bracket member 103 having its shouldered base portion 104 in the plane of an upwardly projecting stop finger 105 provided upon the upper end of the standard 100, and being normally retained in engagement with this stop finger by means of a spring 106 tied between the forwardly projecting arm of the bell crank lever 101 and a pin 107 secured to the forward side of the cradle 73. This mechanism is such that upon pressure being applied to the roller in clockwise direction the bell crank lever will rotate relatively to the standard 100 and the cradle member, as shown in Fig. 7, this action being brought about by means of a rail 108 secured to one side of the upper mold part 23 and having its lower projecting edge disposed in the path of the roller, so that as the die moves from the ejecting position, shown in Fig. 6, into the press, as shown in Fig. 7, it engages the roller and rotates the bell crank lever. During the movement of the mold part in the opposite direction, that is, from the press to the ejecting position, as shown in Fig. 8, the rail 108 contacts the roller 102 and causes the cradle to be rotated in counterclockwise direction, the bell crank lever being rigid with respect to the standard 100 when pressure is applied thereto in counterclockwise direction.

The electrical connections are shown in Fig. 3, which illustrates diagrammatically the arrangement of the two dies 23 and 24 and the stop mechanisms in relations to each of them. The motor for actuating the entire machine is indicated at 109, being driven by a power source 110, to which it is connected by conductor lines 111 and 112, a switch 113 being provided in the line 112 adapted to be actuated to open position by means of a solenoid 114. This solenoid is connected at one side by a conductor line 115 to a power source 116 which is connected at the other side by a conductor line 117 to the frame of the machine 118, and to which are electrically connected one side of the switches 84—84 and the mold parts 23 and 24. At the other side the solenoid is connected by a conductor line 119 to the other sides of the switches 84—84 and the spring contact arms 96. It will be seen from this diagram that whenever any one of the spring contact arms 96 contacts any part of the metal surfaces of the mold parts 23 and 24 the solenoid circuit will be closed to open the switch 113 of the motor thereby stopping the machine, and also that whenever one of the switches 84—84 is closed through actuation of the lever arms 80 the solenoid circuit is closed to open the switch 113 to stop the motor.

The operation is as follows:

During the normal operation of the molding press the lower cavity molds, which are carried upon the vertically movable lower platen, move alternately into the press from their respective loading positions in relation to the loading mechanisms 42 and 43, their cavities being filled with the material to be molded, usually in the form of powder. The upper mold parts 23 and 24 are adapted to be alternately moved into the press from their ejecting positions in relation to the respective ejector brackets 19 and 20. The lower mold part in the press is moved upwardly into cooperative relation with the upper mold part, whereupon the operations of pressing, gassing and curing take place to form the molded articles. Upon lowering of the lower mold part to open the press the mold part is moved to the ejecting position. During this movement the rail 108 contacts the roller 102 moving the cradle to the position shown in Fig. 8, lowering the contact fingers 80 so that they are out of the path of the articles supported upon the force dies 60 and raising the spring contact members 96 so that they are in brushing relation with the articles. These articles being formed of material which is an electrical insulator the contact members will not complete the circuit for actuating the solenoid switch 113 to stop the motor. In the event that one or more of the articles has accidentally remained in the lower cavity mold part however, the force die will be exposed and the spring contact member in line with it will engage it and immediately complete the circuit to the solenoid switch 113 causing it to open and stop the motor. The attendant of the machine will thereupon remove the article from the cavity mold to clear it and re-start the machine, so that the upper mold part will continue its movement to the ejecting position. As the upper mold part moves to its ejecting position the rail 108 moves beyond the roller 102 releasing it so that the mechanism assumes the neutral position shown in Fig. 6. The molded articles are thereupon ejected from the mold by operation of the ejecting mechanism, the pins 61 being forced downwardly to force the articles from the force die 60.

As the upper mold part is moved from the ejecting position into the press the rail 108 engages the roller 102, swinging it to the position shown in Fig. 7, the cradle remaining in its normal position. In this position the rounded ends 81 of the lever arms 80 are clear of the force dies, but are in the path of any molded articles that may accidentally remain upon these dies after the ejecting operation. Such an article is shown in dot-and-dash lines in Fig. 7. As this comes into contact with the arm 80 it causes the arm to swing in clockwise direction rotating the shaft 79 and causing the arm 82 to press the actuating plunger 83 of the switch 84 inwardly to close the circuit to the solenoid actuating switch 113, causing this switch to open and stop the motor. Upon removing the molded article from the force die the attendant re-starts the machine to allow the mold part to move into the press.

I have illustrated and described a preferred and satisfactory embodiment of the invention, but it will be understood that changes may be made therein, within the spirit and scope thereof, as defined in the appended claims.

Having thus described my invention what I claim and desire to secure by Letters Patent is:

1. In an automatic molding machine including a mold part having movement from pressing to ejecting position to carry molded articles formed thereon and return movement from ejecting to pressing position, safety stop mechanism including article contacting means disposed in contiguous relation to the path of movement of said mold part, means actuated by said contacting means to interrupt the operation of the machine, said article contacting means including a contact part operatively actuated by the mold part when an article is missing from said mold part during movement from pressing to ejecting position, and a second contact part operatively actuated by the mold part when an article is present on said mold part during movement from ejecting to pressing position, and means actuated through the movement of said mold part in one or the other directions to render one of said contact parts inoperative while the other contact part is operative.

2. In an automatic molding machine including a mold part having movement from pressing to ejecting position to carry molded articles formed thereon and return movement from ejecting to pressing position, safety stop mechanism including article contacting means disposed in contiguous relation to the path of movement of said mold part, means actuated by said contacting means to interrupt the operation of the machine, said article contacting means including a contact part operatively actuated by the mold part when an article is missing from said mold part during movement from pressing to ejecting position and a second contact part operatively actuated by the mold part when an article is present on said mold part during movement from ejecting to pressing position, and means actuated through the movement of said mold part in one or the other directions to move one of said contact parts out of article contacting position while the other contact part is in article contacting position.

3. In an automatic molding machine including a mold part having movement from pressing to ejecting position to carry molded articles formed thereon and return movement from ejecting to pressing position in the same planular path, safety stop mechanism including article contacting means disposed in contiguous relation to the path of movement of said mold part, means actuated by said contacting means to interrupt the operation of the machine, said article contacting means including a contact part operatively actuated by the mold part when an article is missing from said mold part during movement from pressing to ejecting position and a second contact part operatively actuated by the mold part when an article is present on said mold part during movement from ejecting to pressing position, and means actuated through the movement of said mold part in one or the other directions to render one of said contact parts inoperative while the other contact part is operative.

4. In an automatic molding machine including a mold part having movement from pressing to ejecting position to carry molded articles formed thereon and return movement from ejecting to pressing position, safety stop mechanism including article contacting means disposed in contiguous relation to the path of movement of said mold part, and movable between an article contacting operative position and an article clearing inoperative position, means actuated by said contacting means to interrupt the operation of the machine, and means actuated through the movement of said mold part to move said contacting means into operative position during movement of said mold part in one direction and to move it into inoperative position during movement in the other direction.

5. In an automatic molding machine including a mold part having movement from pressing to ejecting position to carry molded articles formed thereon and return movement from ejecting to pressing position in the same path, safety stop mechanism including a movably mounted contact part disposed in contiguous relation to the path of movement of said mold part, electrical circuit means between said mold part and said contact part, circuit opening means in said circuit adapted to be actuated to stop operation of the machine, said electrical circuit being completed through direct contact of said contact part with said mold part, said molded articles carried upon said mold part constituting electrical insulating means between said mold part and said contact part, and trip means carried by said mold part for cooperation with said contact part to move it out of the path of said mold part during its movement from ejecting to pressing position.

6. In an automatic molding machine including a mold part having movement from pressing to ejecting position to carry molded articles formed thereon and return movement from ejecting to pressing position in the same path, ejecting means in relation to the ejecting position of said mold part cooperating therewith to remove said articles therefrom, safety stop mechanism including a switch adapted upon actuation to stop the machine, a movably mounted actuating member for said switch disposed in the path of movement of articles upon said mold part during movement from ejecting to pressing position, and trip means carried by said mold part for cooperation with said actuating member to move it out of the path of said articles upon said mold part during its movement from pressing to ejecting position.

7. In an automatic molding machine including a mold part having movement from pressing to ejecting position to carry molded articles formed thereon and return movement from ejecting to pressing position in the same path, safety stop mechanism including a contact part disposed in contiguous relation to the path of movement of said mold part, electrical circuit means between said mold part and said contact part, circuit opening means in said circuit adapted to be actuated to stop operation of the machine, said electrical circuit being completed through direct contact of said contact part with said mold part, said molded articles carried upon said mold part constituting electrical insulating means between said mold part and said contact part, switch means adapted upon actuation to actuate said circuit opening means to stop the machine, a movably mounted actuating member for said switch means disposed in the path of movement of articles upon said mold part during movement from ejecting to pressing position, and trip means carried by said mold part for cooperation with said actuating member to move it out of the path of said articles on said mold part during its movement from pressing to ejecting position and for cooperation with said contact part to move it out of the path of said mold part during its movement from ejecting to pressing position.

LANCASTER P. CLARK, JR.